United States Patent [19]

Hofmann

[11] Patent Number: 4,814,607
[45] Date of Patent: Mar. 21, 1989

[54] METHOD AND APPARATUS FOR IMAGE RECORDING OF AN OBJECT

[75] Inventor: Otto Hofmann, Kirchstockach, Fed. Rep. of Germany

[73] Assignee: Messerschmitt-Bölkow-Blohm GmbH, Munich, Fed. Rep. of Germany

[21] Appl. No.: 42,478

[22] Filed: Apr. 24, 1987

[30] Foreign Application Priority Data

Apr. 26, 1986 [DE] Fed. Rep. of Germany ....... 3614159

[51] Int. Cl.[4] .............................................. H01J 3/14
[52] U.S. Cl. ..................................... 250/235; 358/109
[58] Field of Search ............... 250/235, 236, 353, 347; 358/109; 356/29; 244/3.16

[56] References Cited

U.S. PATENT DOCUMENTS

| | | | |
|---|---|---|---|
| 4,543,603 | 9/1985 | Laurés | 358/109 |
| 4,628,354 | 12/1986 | Nagura | 358/109 |
| 4,630,111 | 12/1986 | Blain | 358/109 |
| 4,689,748 | 8/1987 | Hofmann | 358/109 |
| 4,710,809 | 12/1987 | Ries | 358/109 |

Primary Examiner—David C. Nelms
Assistant Examiner—Jessica Ruoff
Attorney, Agent, or Firm—Toren, McGeady & Associates

[57] ABSTRACT

A method and apparatus for recording the image of an object, for instance the earth's surface, from a flying body, in this case an earth satellite. The flying body flies over the object at an altitude. Herein, the object is scanned in lines by a line scanner. The viewing angle α of the liner scanner with respect to the direction of flight v is increased during the scanning process, whereby a higher resolution capacity is attained. Preferably several line sensors are used in the line scanner, which are arranged on a carrier, which is displaced during the flight of the flying body relative to a length in the direction of flight v. The displacement occurs by way of a cyclically functioning drive.

4 Claims, 3 Drawing Sheets

METHOD AND APPARATUS FOR IMAGE RECORDING OF AN OBJECT

BACKGROUND OF THE INVENTION

1. Field of the Invention

The invention is directed to a method and an apparatus for image recording of an object from a flying object by optically scanning the object.

2. Description of Related Art

In the course of the last two decades, aerial photography of, for example, the surface of the earth with the help of conventional photo cameras adapted to this specific purpose has been increasingly replaced or supplemented by high resolution scanning processes, beginning with the help of vidicons, and later with photosemiconductor line sensors of the charge-coupled memory type. Herein, a flying object, for instance an earth satellite, flies at high altitude over the object, for instance the earth surface, and flies essentially parallel to the surface of the earth. The object is then optically scanned in lines oriented essentially transverse to the direction of flight at a specific angle of view $\alpha$, which lies in a vertical plane through the direction of flight. The recorded image lines are subsequently processed into an overall image.

The resolution of the image recorded transverse to the direction of flight depends, among other things, on the focal length of the scanner used. Therefore, by increasing the focal length, the ground pixel can theoretically be made as small as desired, even at great flight altitudes, as they occur in the course of imaging the surface of the earth by satellites. On the other hand, the pixel resolution in direction of flight is also dependent on the flight speed and the exposure time. In the case of satellites, the speed of flight is a predetermined, substantially invariable magnitude of approximately 7000 meters-per-second. In order to achieve a sufficiently small pixel resolution in the direction of flight, the exposure time for one line must thus be sufficiently small, or, accordingly, the line frequency must be sufficiently large. However, the limited sensitivity of the sensors used hinders very short exposure times, resulting in the signal-to-noise relationship becoming unfavorable. The same considerations apply also for rapidly moving flying objects in ground proximity, if one requires a large resolution.

For map making imaging of the surface of the earth from cosmic space, a high ground pixel resolution and thus small ground pixel diameters are desired. In order to solve this problem in view of the above difficulties, so-called TDI sensors, where TDI stands for "time delay and integration", have been developed. These sensors consist of several sensors lines arranged in parallel fashion, whose weak image signals are integrated from line to line. These sensors are, however, very expensive. Apart from that, the sensor lines must be very accurately aligned with the direction of flight, and the timing frequency of the line sensors must be exactly tuned to the image movement, i.e. to the speed of flight and the flight altitude of the flying object. Additionally, the sensitivity of the TDI sensor increases not proportionally with the number of the parallel lines, but rather only approximately proportionate to the root, since the noise also increases with the root.

A comprehensive presentation of the digital imaging technology with line sensors can be had from the paper of O. Hofmann, which was published in the publication Bildmessung und Luftbildwesen, 50th year (1982), Vol. 1, lines 16–32.

SUMMARY OF THE INVENTION

An object of the invention is to provide a method and a device of the type which increases, in a simple manner, the resolution of the object pixels of the object in the direction of flight and flexibly adapts the resolution transverse to the direction of flight and match it with the direction of flight.

This object is achieved in a method for recording an image of an object from a flying body which flies over the object, the method comprising optically scanning the object at a specific viewing angle with respect to a direction of flight, in lines lying essentially transverse to the direction of flight, and combining the scanned image lines to form an overall image, characterized in that said method further comprises increasing the viewing angle with respect to the direction of flight during said scanning.

The above object is further achieved in an apparatus for recording an image of an object from a flying body which flies over the object, said apparatus comprising a line scanner which optically scans a line on a surface of the object lying substantially transverse to a direction of flight of the flying body at a viewing angle with respect to the flight direction, and means for combining the image lines into an overall image, characterized in that said apparatus further comprises means for increasing the viewing angle $\alpha$ with respect to the flight direction.

In accordance with the invention, the viewing angle $\alpha$ is increased with respect to the direction of flight during the scanning process, so that during a specific time interval of the image recording, the area scanned by one sensor line in the direction of flight has a smaller length than the projection of the flight path upon the object in the horizontal direction.

The viewing angle $\alpha$ is adjusted in a cyclical motion approximately proportional to the flight speed, beginning with an initial value which is then increased across a limited angular range and subsequently, for a short time, is again adjusted to the initial value. Depending upon the matching of the rotational speed of the viewing angle to the flight altitude and the flight speed of the flying object, a corresponding strip of the object is then recorded. The strips can follow each other contiguously, if the object is simultaneously scanned at different viewing angles with several sensors, which are all regulated, in the sense of the invention, with respect to the flight direction. The regulation's velocity can be tuned in such a manner that, viewed in the direction of flight, the length during one cycle of scanned area upon the surface of the object corresponds to the horizontal projection of the flight path during the cycle.

For changing the viewing angle, there exist several possibilities, for instance, swivelling the earth satellite around its pitching axis, displacing the objective relative to the image plane, which contains the sensor lines, as against the direction of flight, or displacing the sensor lines in the image plane in the direction of flight, or optical deviation means of another type can be provided. If several line sensors are provided, a special lens can be provided for each line sensor, or for a specific group of line sensors, so that the twisting of the viewing angle can be individually regulated.

The most favorable possibility is, however, to utilize several optoelectronic line sensors arranged transverse to the flight direction, and to position these line sensors in a carrier located in the image plane of the line scanner and to displace these sensors slowly with a cyclically functioning drive in the image plane during the scanning process and to return the same subsequently rapidly into the initial position. The displacement velocity is chosen with respect to the flight speed of the flying object, the focal length of the line scanner, the number of the sensor lines and the flight altitude in such a way that the object is recorded without gaps.

Naturally, it is not absolutely required to record an object without gaps if, for instance, only specific areas of the object are of interest. Then, the resolution in these areas can merely be magnified according to the principle of the invention.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENT

Figure 1:
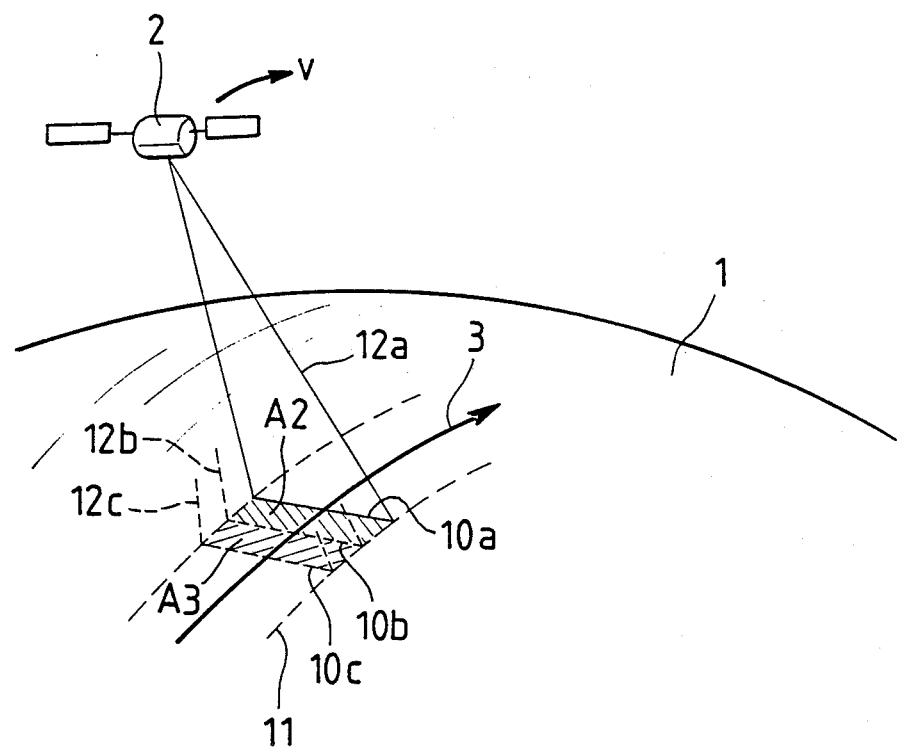
FIG. 1 is a schematic view of an earth satellite for image recording of the earth surface with a line scanning method according to the invention.

FIG. 1 shows schematically a portion 1 of the earth's surface, above which an earth satellite 2 flies in the direction of the arrow shown with the velocity v at a constant flight alititude H. The projection of the flight path of the satellite 2 on the earth surface 1 in the horizontal direction is designated with 3. An apparatus for image recording of the surface 1 is provided aboard the satellite 2, which contains, as an essential part, a line scanner 4 schematically indicated in FIG. 2. This line scanner 4 includes an input optical arrangement 5 with a focal length c and several line sensors, in this case three line sensors 6a, 6b and 6c, in the image plane of the input optical arrangement. These line sensors 6a–6c are oriented transverse to the flight direction of the satellite 2 and are arranged on a carrier 7 according to FIG. 3. The carrier 7 is conducted, similar to a conveyor belt, around two conveying rollers 8a and 8b, whereby one of the rollers 8a is driven by a motor 9. The motion of the carrier 7 lies in the flight direction. The spacing between the individual line sensors 6a–6c in this direction is designated with a.

Figure 2:
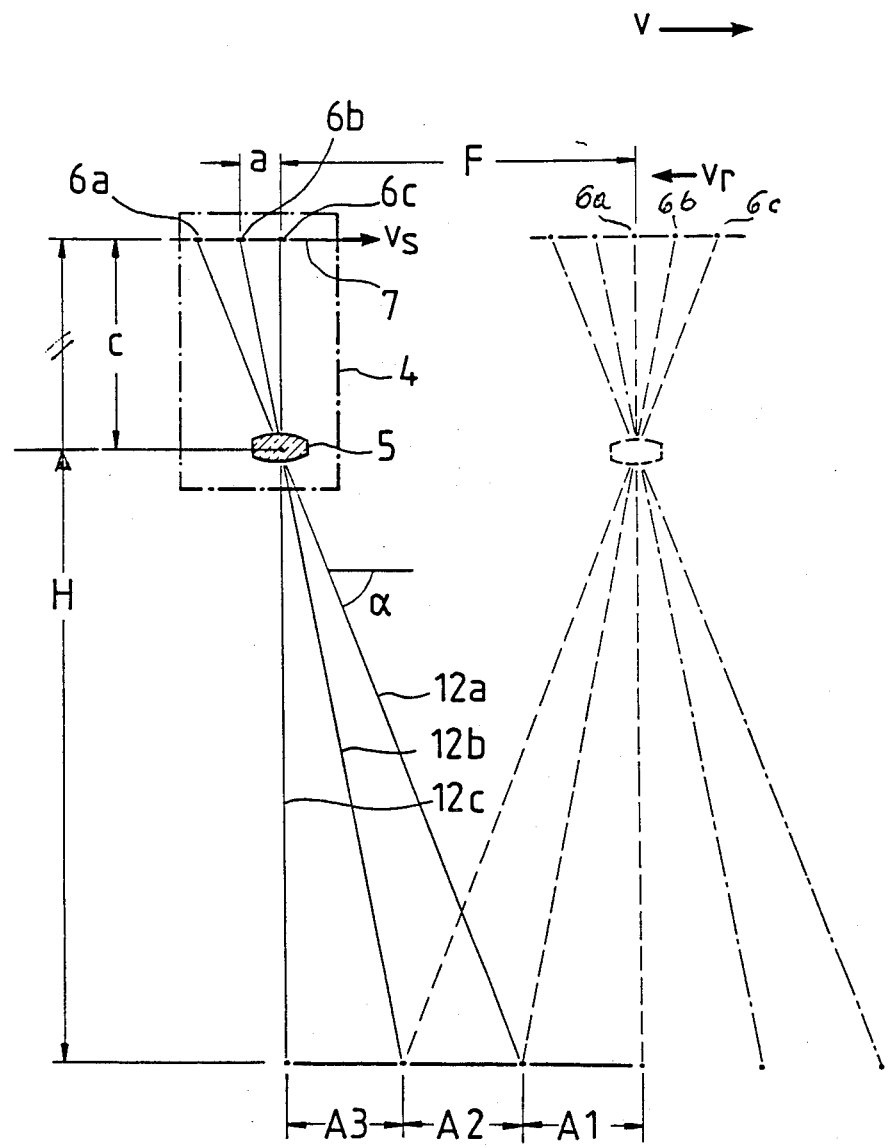
FIG. 2 is a schematic diagram of the method according to the invention.
Figure 3:
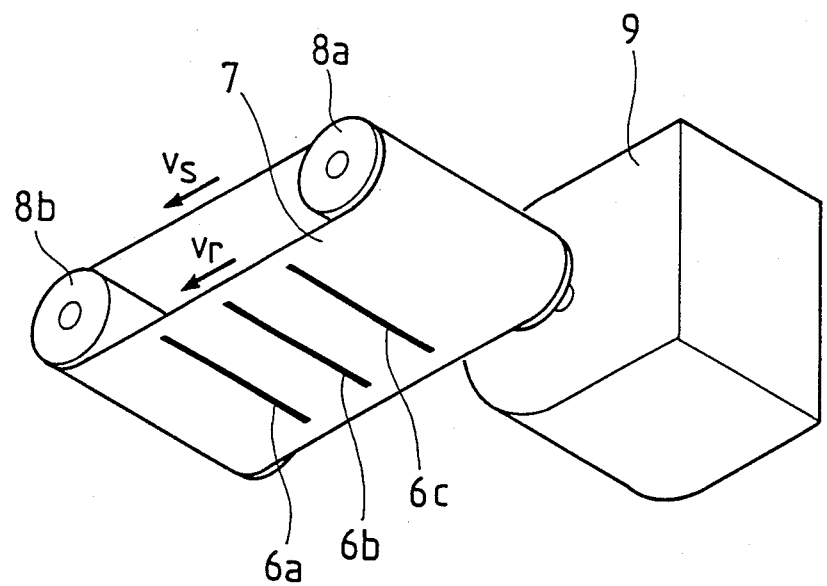
FIG. 3 is an arrangement of line sensors in a line scanner according to the invention.

The line sensors 6a, 6b or 6c image, respectively, lines 10a, 10b or 10c on the earth surface 1, so that in the course of the flight of the earth satellite 2, a surface strip 11 with the width of the line 10 is recorded by the line scanner 4. In FIGS. 1 and 2, the fan-shaped flat beam bundles, which constitute each line 10a, 10b or 10c, together with the assigned line sensor 6a, 6b, 6c, are designated with 12a, 12b and 12c, respectively. The angle between the central bundle of each fan-shaped beam bundle 12a, 12b and 12c with respect to the flight direction v of the satellite 2 is defined as the respective viewing angle $\alpha_i$ (i=a, b, . . .).

As is shown in the left half of FIG. 2, the line sensors 6a–6c are, to begin with, oriented in such a manner that the viewing angle of the line sensor 6c is 90°, i.e. the radiation beam 12c lies in the vertical plane. The beam 12a is directed forward, so that the viewing angle of the line sensor 6a is smaller than 90°. The carrier 7 of the line sensors 6a–6c is displaced in the flight direction with a small constant displacement velocity vs during the flight of the satellite 2. This displacement velocity vs is maintained until, after a defined flight travel distance F of the satellite 2, the viewing angle of the sensor 6a lies in the vertical direction. All the viewing angles $\alpha_n$ with respect to the direction of flight assigned to the individual line sensors 6a–6c, have thus been increased, so that in the position of the satellite 2 shown in the right half of FIG. 2, the viewing angles of the line sensors 6b and 6c are directed rearwards. The beams associated with the line sensors 6a–6c after the flight travel distance F are shown in dotted lines in FIG. 2. During the flight travel distance F of the satellite 2, the line sensor 6a has recorded the partial strip A1, the line sensor 6b, the partial strip A2, and the line sensor 6c, the partial strip A3. The equally wide partial strips are contiguous.

From the geometrical relationship depicted in FIG. 2, the displacement velocity vs is calculated to be:

$$VS = \frac{V \cdot C}{n \cdot H}$$

wherein n represents the quantity of the line sensors, in this case n=3, and v is a predetermined flight speed. A pixel size D on the earth surface 1 in the flight direction can be calculated to be:

$$D = v/(n \cdot f)$$

In the illustrated case, the resolution has thus been increased by a factor of 3 compared to a line scanner with one single line sensor. Such an increased resolution capacity corresponds to that of a TDI sensor within approximately nine lines.

At the end of the flight path F, the motor 9 is reversed and returns the carrier 7, at high speed $V_r$, to its original position. This is depicted in the right half of FIG. 2 in dotted broken lines.

The minimum distance a between the line sensors depends on the space requirements. The maximum distance is limited by the field of view of the lens 5 of the line scanner 4. The displacement velocity and the duration of the cycle of the motor 9 depends on the number of the line sensors n, and thus, indirectly, also on the selection of this distance a. The displacement velocity of the carrier 7 must be measured accurately and registered synchronously with the image line recording, so that the image coordinates of the line sensors are accurately known at each point in time of the line scanning.

The earth curvature has been neglected in each of the respective formulae given above. If the satellite flies at an altitude of 300 km., then the earth curvature measured with respect to the middle tangent with a flight path of 400 km. amounts to approximately 3.5 km., thus approximately 1% of the flight altitude. It is naturally possible to correct for this if the earth curvature has to be taken into account.

The invention can also be advantageously utilized in digital photomapping systems, in which three line sensor groups are used, which scan the earth's surface in respectively different viewing angles according to the method of the invention.

Numerous alterations of the structure herein disclosed will suggest themselves to those skilled in the art.

However, it is to be understood that the present embodiment is for purposes of illustration only and not to be construed as a limitation of the invention. All such modifications which do not depart from the spirit of the invention are intended to be included within the scope of the appended claims.

What is claimed is:

1. A method for recording an image of an object from a flying body which flies over the object, said method comprising:
   (A) optically scanning the object at a viewing angle with respect to a direction of flight, in lines lying essentially transverse to the direction of flight;
   (B) increasing the viewing angle with respect to the direction of flight during said scanning; and
   (C) combining the scanned image lines to form an overall image, characterized in that said method further comprises:
   (D) optically scanning said object simultaneously at different viewing angles; and
   (E) simultaneously increasing said viewing angles over a limited angular range in a cyclic manner with reference to the direction of flight and subsequently returning said viewing angles to their initial values, said viewing angles being selected and cyclically changing so that image segments composed from the image lines recorded during one cycle are directly adjacent to each other and correspond to surface strips on the object scanned under the differing viewing angles.

2. A method according to claim 1, characterized in that a combined length of the surface strips scanned on the surface of an object during one cycle viewed in the direction of flight corresponds to a horizontal projection on the object of a flight path of the flying body.

3. An apparatus for recording an image of an object from a flying body which flies over the object, said apparatus comprising a line scanner having input optics which optically scans a line on a surface of the object lying substantially transverse to a direction of flight of the flying body at a viewing angle $\alpha$ with respect to the flight direction, means for increasing the viewing angle $\alpha$ with respect to the flight direction, and means for combining the image lines into an overall image, characterized in that said line scanner comprises several parallel opto-electronic line sensors arranged transverse to the direction of flight, and said means for increasing the viewing angle comprises a carrier on which said lines sensors are arranged and a cyclically operating drive for displacing said carrier in the image plane, said drive initially displacing said carrier slowly in the direction of flight and subsequently rapidly returning said carrier into an initial position thereof.

4. Apparatus according to claim 3, characterized in that a displacement velocity vs of the carrier is adjusted to be $$vs = \frac{V \cdot C}{n \cdot H}$$

wherein v represents a flight speed of the flying body with respect to the object, c is a focal length of the line scanner, n is a quantity of the line sensors, and H is a flight altitude of the flying body above the object.

* * * * *